Sept. 22, 1964

A. L. SCHILS ETAL 3,150,300

CAPACITOR

Filed April 28, 1961

INVENTORS
ALVIN L. SCHILS
WALTER F. ENGLAND

BY *Connolly and Hutz*

THEIR ATTORNEYS

United States Patent Office 3,150,300
Patented Sept. 22, 1964

3,150,300
CAPACITOR
Alvin L. Schils and Walter F. England, both of Nashua, N.H., assignors to Sprague Electric Company, North Adams, Mass., a corporation of Massachusetts
Filed Apr. 28, 1961, Ser. No. 106,430
3 Claims. (Cl. 317—258)

This invention relates to a miniature electrostatic capacitor, and more particularly to a miniature resin encased plastic film capacitor.

So-called film capacitors are well known in the art. In general, film capacitors comprise capacitance sections having a pair of metallic foil electrodes separated by and convolutely wound with plastic film dielectric ribbons. It is the practice of this art to roll film capacitors in extended foil fashion; that is, with an edge of one foil extending from one end of the capacitance section, and an edge of the second foil extending from the opposite end of the section. Terminals usually consist of pig-tail lead-wires which are soldered to the extended foil edges. The film capacitors of the art are customarily finished by applying a wrapper of adhesive coated plastic film over the capacitance section and the terminations, and then filling the ends of the wrapper with resinous end-seals.

Although the above described film capacitors are generally highly acceptable in the electronics industry, there are demands by segments of that industry for smaller and more uniform film capacitors for use in computers and transistorized circuits. Prior to this invention, small film capacitors have not fully satisfied these segments of the industry because of relatively poorly aligned and poorly secured lead-wires which fouled automated circuit assembly equipment, as well as the ever present stigma of excessive size.

It is an object of this invention to provide film capacitors that do not suffer the disadvantages of the prior art.

It is another object of this invention to provide film capacitors of reduced size that have an extremely high degree of uniformity and reproducibility.

It is a still further object of this invention to provide film capacitors of various voltage and capacitance ratings that are of reduced size and have axially aligned lead-wires firmly secured to the capacitance sections.

These and other objects of this invention will become more apparent by consideration of the following description and claims taken together with the accompanying drawing, in which:

Figure 1:
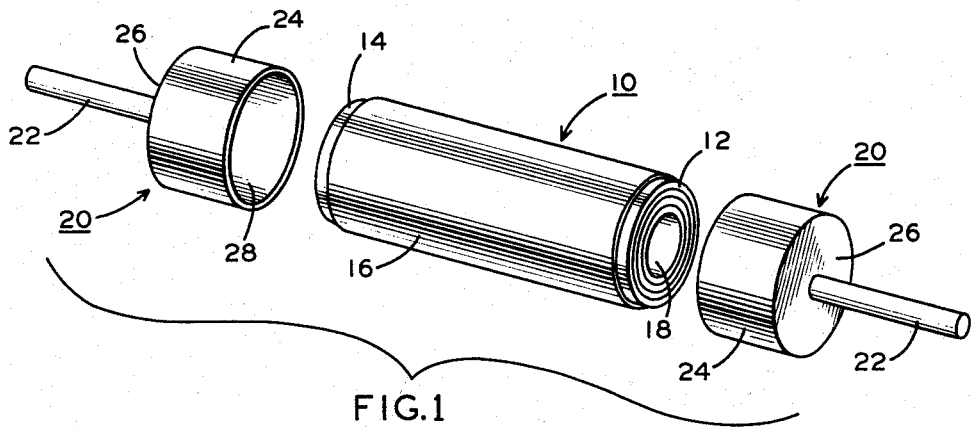
FIG. 1 is a perspective in exploded fashion of a capacitance section and the terminal assemblies according to this invention.

In general, the objects of this invention are attained by providing a small film capacitance section with end cap assemblies and an encompassing coating of resinous material.

More particularly, the objects of this invention are attained by providing a miniature film capacitance section with end cap assemblies having axial lead-wires secured thereto and a spray deposited coating of resinous material that extends over the section and the end caps. The size advantage of this invention is especially realized in the miniature capacitors of low voltage and low capacitance ratings.

The drawing shows a convolutely wound capacitance section 10 having electrodes 12 and 14 wound in extended-foil fashion with plastic film dielectric material 16. The term "extended-foil" is used in this application to define a capacitance section having a pair of electrodes in substantial capacitive relationship to one another; the edge of one electrode extends from one end of the section beyond the other electrode and the dielectric material, and the second of the pair of electrodes extends in a like manner from the opposite end of the section. As depicted in the drawing, this invention relates particularly to capacitance sections of low capacitance rating such that only a few turns of electrodes and dielectrics are required. For ease in handling and particularly for ease in rolling an automatic rolling equipment, these low capacitance rating sections take the form of a tube having a large internal bore 18 relative to the thin electrically active wall.

Electrodes 12 and 14 may be of any of the conventional materials used in electrostatic capacitors. Thus electrodes 12 and 14 may consist of vapor deposited metallic strata on dielectric supporting bases, or may consist of discrete foils. However, for the best exercise of the inventive concept of this invention, it has been found that electrodes 12 and 14 should be discrete foils of alloys containing a high percentage of tin, for example 83% tin and 17% lead, so as to facilitate later assembly operations which involve the use of resistance soldering techniques.

In a like manner, dielectric material 16 may comprise any of the dielectric materials that are conventionally employed in electrostatic capacitors. However, for the best exercise of this invention, it is desired that dielectric material 16 be composed of any of the well-known plastic films that are used in capacitors so as to permit the preferred embodiment of attaching terminals to the capacitance section. Plastic films are also particularly desirable in the so-called "uncased capacitors" (non-hermetically sealed) of this invention because plastic film capacitance sections are not sensitive to moisture pickup. The capacitor construction of this invention has been found to be particularly adapted to the use of polyester films and vinyl polymer films, and more particularly to the use of polyethylene terephthalate films and polystyrene films, respectively.

In accordance with conventional capacitor practice, capacitance section 10 is preferably converted to a relatively rigid and self-sustaining tubular body by heat treatment of the convolute winding of electrodes and plastic films. The resulting structure provides an extremely limited area of foil extending from each end for the attachment of terminals. The practice of the prior art has been to attempt to attach the loop of a pig-tail lead-wire to the thin tubular wall of extending electrode edges by means of solder. This prior art practice has been extremely difficult and has not produced a product able to withstand, with any degree of consistency or reproducibility, the various vibration and pull-test requirements of the industry. Moreover, the prior art use of pig-tails has not produced a product that could consistently provide lead-wires that are in the axial alignment required by automated circuit assembly apparatus.

Figure 2:
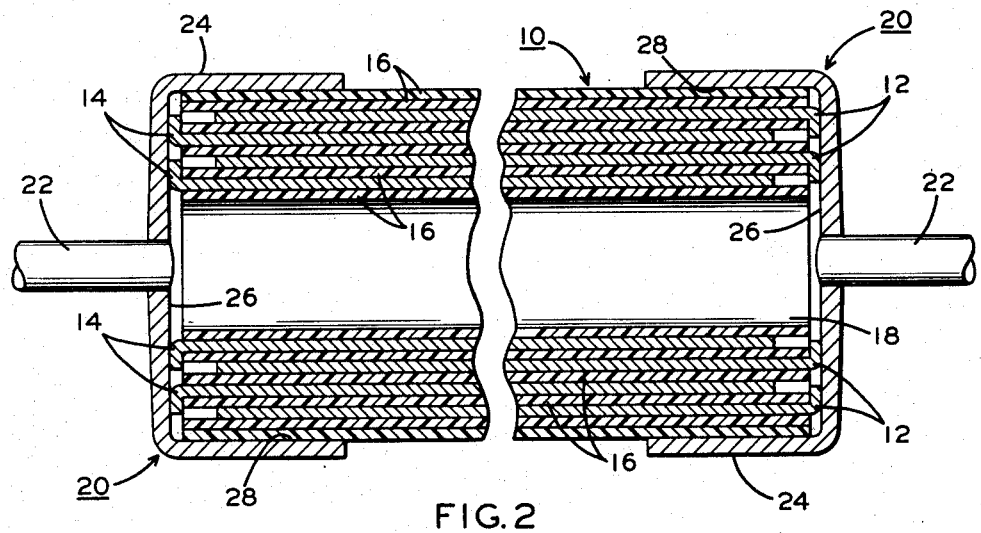
FIG. 2 is a cross-section of an assembled capacitor according to this invention.
Figure 3:
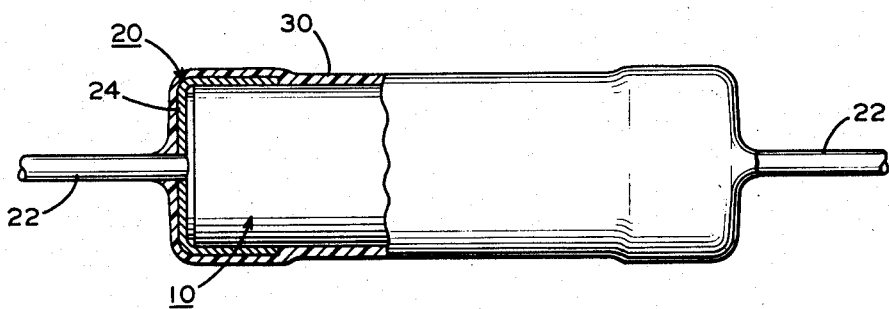
FIG. 3 is a partial cross-section of a completed encased capacitor constructed according to this invention.

This invention makes a distinct departure from the prior art by utilizing terminals 20 as a means for terminating capacitance section 10 and providing lead-wires thereto. Terminals 20 are essentially of a two-part construction that is integrated by welding a lead-wire 22 to a cup-shaped member 24. The state of the welding art is such that terminals 20 can be consistently provided with lead-wires 22 centrally disposed and axially aligned with cups 24. An effective alternative method of producing end caps 20 is to swage a lead-wire 22 into a centrally located square hole in the bottom 26 of cup 24 and thereafter hot tinning the unit. Lead-wire 22 and cup 24 may be made of any suitable electrically conductive material. However, for the purposes of facilitating the resistance soldering techniques that form a preferred embodiment of carrying out this invention, it has been found desirable to provide members 22 and 24 with an outer surface of tin. Cup 24 has a generally flat bottom 26 that is substantially normal to circumferentially straight wall 28. As shown in FIGURES 2 and 3, flat bottom 26 is brought into electrical contact with the extending edges of foils 12 and 14 at the respective ends of section 10. Terminal 20 is supported against axial displacement by side wall 28 which is in relatively snug fit with a substantial length of section 10. Terminal 20 is fixedly secured to section 10 by any of the conventional soldering techniques known to the capacitor art. The preferred embodiment of this invention utilizes resistance soldering to join tin coated terminal 20 to the tin alloy electrodes 12 and 14.

The heat and pressure applied to terminal 20 and section 10 in the soldering operation causes the outer layers of plastic film 16 to soften and flow into intimate contact with side wall 28 to further secure the terminal to the section. Plastic film 16 of this invention, of which polyester films and vinyl polymer films are preferred embodiments, is identified hereinafter as thermoplastic because of this softening and flowing property, without regard to classical distinctions which may exist between thermoplastic and thermoset resins involving extent of cross-linking and method of manufacture. This bond between the plastic and the wall of the end cap greatly enhances the ability of the capacitor of this invention to withstand pull-tests and vibration tests designed to establish the durability of capacitor terminations.

FIGURE 3 shows the preferred encasement of the capacitor of this invention. A coating 30 of resinous material completely covers the end caps 20 and capacitance section 10 of FIGURE 2 to provide the structure shown partially in cross-section in FIGURE 3. If desired, resin coating 30 may be permitted to extend up each lead-wire a short distance beyond cup 24 to ensure against voids at the weld between the component parts of terminal 20. Resin coating 30 is preferably deposited by spraying a plurality of thin layers of epoxy onto section 10 and terminals 20 with suitable masking applied to lead-wires 22. The epoxy coating is then cured by heat treatment to establish an extremely smooth and impervious encasement of the capacitor. The coating according to this invention provides a highly satisfactory base for the stamping of identifying indicia.

The advantage of multiple coatings is that any spots that might be missed in a single pass spraying operation are suitably filled. The use of multiple coatings also provides the opportunity of using a different coating material for each of the layers so as to attain the desirable properties offered by the various coating materials.

The epoxy resin of the preferred embodiment of this invention could be applied in a solvent system, with suitable provision being made for driving off the solvent between successive passes through the spraying equipment. However, it is desirable to employ a straight epoxy system which is free of solvent so as to remove the possibility that pores might be produced in the coating by the evolution of the solvent. Thus, multiple spray coatings of solvent-free epoxy constitutes the preferred embodiment for resin coating 30. Those skilled in the art should understand that other resins are suitable for coating 30 of this invention, for example, silicones, phenolics, and diallyl phthalate. In a like manner, it should be understood that the preferred method of deposition of coating 30, which is spraying, could be replaced by other means, such as a fluidized bed deposition of dry resin powder onto heated units with a subsequent curing operation.

One of the advantages of the capacitor construction of this invention resides in the short production time needed for the straight line assembly operations. Less than a day is required for rolling and curing capacitance section 10, soldering terminal 20 to section 10, and masking and spraying to provide coating 30. There is no impregnation or other time consuming step, such as in the prior art of pouring and setting of resin end seals, which would prevent the use of straight line assembly techniques.

The following specific example is recited of a preferred embodiment of the structure and procedures for producing a film capacitor according to this invention. However, it should be understood that this example is illustrative only and should not be construed to be limitative beyond the scope of the appended claims.

Two strips of polyethylene terephthalate (Mylar) 5/16" wide x .0005" thick were rolled as spacers between two tin-alloy foils (83% tin, 17% lead) 1/4" wide x .0002" thick on a .060" mandrel in an extended foil fashion with foil extensions of 1/16" on each side of the roll. A plastic film margin of 1/8" was provided beyond the non-extended or internal edge of each foil to leave an effective foil width or capacitive overlap of 1/16". This construction was rolled until a diameter of .090" was obtained; with a .060" mandrel this produced a tubular capacitance section having a wall thickness of .015". This construction produced a capacitance of 300 pfd. This tubular capacitance section was cured for one hour at 105° C. and three hours at 125° C. to provide a rigid self-sustaining capacitance section. End caps of hot tinned brass having an O.D. of .120" and an I.D. of .100" and a wall length of .060" were fitted on the ends of the cured capacitance section and secured thereto by resistance heating, which effected a solder bond between the tin alloy foil extensions and the tin coating of the end caps. The lead-wires from the end caps were then suitably masked, and the capacitance section and end caps were sprayed with an epoxy resin coating material. A build-up of .0015" per spray was employed, with a 10 minute drying cycle at 90° C. between successive sprays. Two spray passes were employed to produce a minimum wall thickness for the coating of .003".

As many apparently widely different embodiments of this invention may be made without departing from the spirit and scope hereof, it is to be understood that the invention is not limited to the specific embodiments hereof except as defined in the appended claims.

We claim:

1. A capacitor comprising a convolutely wound extended-foil capacitance section of tin-containing electrodes separated by thermoplastic film dielectric ribbons, at least one of said dielectric ribbons being continued beyond the end of said electrodes to form the outer layer of said section, a pair of tinned end-caps each having an axially disposed lead-wire extending therefrom, said outer layer flowed into bonding relationship with the walls of said tinned end-caps, and said tin-containing electrodes flowed into bonding relationship with the tin of said tinned end-caps, and a resin coating over said section and said end-caps.

2. A capacitor comprising a convolutely wound extended-foil capacitance section having tin-containing electrodes separated by plastic films and having a thermoplastic film outer wrap, a tinned end-cap encompassing an end of said section and secured by a tin bond between the tin of the electrode extending therefrom and the tin of said end-cap, and a plastic bond between the plastic of said outer wrap and the wall of said end-cap, a lead-wire secured to said end-cap in axial alignment with said section.

3. A capacitor as defined in claim 2 wherein said electrodes and said plastic films are so constructed and arranged that said section has the form of a thin-walled tube with a large bore relative to the active wall thickness.

References Cited in the file of this patent

UNITED STATES PATENTS

| | | |
|---|---|---|
| 2,047,273 | Kopinski | July 14, 1936 |
| 2,525,668 | Gray | Oct. 10, 1950 |
| 2,736,847 | Barnes | Feb. 28, 1956 |
| 2,872,630 | Cummin et al. | Feb. 3, 1959 |
| 2,904,733 | Robinson et al. | Sept. 15, 1959 |

FOREIGN PATENTS

| | | |
|---|---|---|
| 569,202 | Great Britain | May 11, 1945 |